(12) United States Patent
Dunphy et al.

(10) Patent No.: US 11,520,103 B1
(45) Date of Patent: Dec. 6, 2022

(54) RECONFIGURABLE OPTICAL SIGNAL ROUTING SYSTEMS USING FLUID CHANNELS BETWEEN WAVEGUIDES

(71) Applicant: Waymo LLC, Mountain View, CA (US)

(72) Inventors: James Dunphy, San Jose, CA (US); David Hutchison, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/411,880

(22) Filed: Aug. 25, 2021

Related U.S. Application Data

(63) Continuation of application No. 16/667,727, filed on Oct. 29, 2019, now Pat. No. 11,125,941.

(51) Int. Cl.
| | | |
|---|---|---|
| *G02B 6/12* | (2006.01) | |
| *H04B 10/071* | (2013.01) | |
| *G02B 6/35* | (2006.01) | |
| *G02B 6/293* | (2006.01) | |

(52) U.S. Cl.
CPC ..... *G02B 6/12004* (2013.01); *G02B 6/29332* (2013.01); *G02B 6/3568* (2013.01); *H04B 10/071* (2013.01)

(58) Field of Classification Search
CPC combination set(s) only.
See application file for complete search history.

(56) References Cited

U.S. PATENT DOCUMENTS

| | | |
|---|---|---|
| 6,195,478 B1 | 2/2001 | Fouquet |
| 6,470,106 B2 | 10/2002 | McClelland et al. |
| 7,016,560 B2 | 3/2006 | Ticknor et al. |
| 7,263,253 B2 | 8/2007 | Davis et al. |
| 7,283,696 B2 | 10/2007 | Ticknor et al. |
| 7,346,234 B2 | 3/2008 | Davis et al. |
| 7,352,927 B2 | 4/2008 | Davis et al. |
| 7,362,930 B2 | 4/2008 | Davis et al. |
| 7,539,371 B2 | 5/2009 | Martinelli et al. |
| 8,861,904 B2 | 10/2014 | Erickson et al. |
| 9,195,009 B2 | 11/2015 | Reid |
| 10,503,007 B1 | 12/2019 | Parsons et al. |
| 10,529,290 B1 | 1/2020 | Parsons et al. |
| 11,125,941 B1 | 9/2021 | Dunphy et al. |
| 2003/0012483 A1 | 1/2003 | Ticknor et al. |
| 2003/0215179 A1 | 11/2003 | Mcguire, Jr. |

(Continued)

FOREIGN PATENT DOCUMENTS

| | | |
|---|---|---|
| WO | 02069016 A2 | 9/2002 |
| WO | 2018148153 A1 | 8/2018 |

*Primary Examiner* — Andrew Jordan
(74) *Attorney, Agent, or Firm* — McDonnell Boehnen Hulbert & Berghoff LLP

(57) ABSTRACT

One example system comprises a substrate and a waveguide disposed on the substrate to define an optical path on the substrate. The waveguide is configured to guide, inside the waveguide and along the optical path, a light signal toward an edge of the waveguide. The edge defines an optical interface between the waveguide and a fluidic optical medium adjacent to the edge of the waveguide. The system also includes an optical fluid and a fluid actuator configured to adjust a physical state of the optical fluid based on a control signal. The adjustment of the physical state of the optical fluid causes an adjustment of the fluidic optical medium adjacent to the edge.

20 Claims, 13 Drawing Sheets

(56) References Cited

U.S. PATENT DOCUMENTS

| | | |
|---|---|---|
| 2006/0083473 A1 | 4/2006 | Ticknor et al. |
| 2006/0228070 A1 | 10/2006 | Davis et al. |
| 2006/0228071 A1 | 10/2006 | Davis et al. |
| 2006/0228072 A1 | 10/2006 | Davis et al. |
| 2018/0045893 A1 | 2/2018 | Huybrechts et al. |
| 2020/0096634 A1 | 3/2020 | Droz et al. |
| 2020/0142312 A1 | 5/2020 | Dunphy et al. |

RECONFIGURABLE OPTICAL SIGNAL ROUTING SYSTEMS USING FLUID CHANNELS BETWEEN WAVEGUIDES

CROSS-REFERENCE TO RELATED APPLICATIONS

This application is a continuation of U.S. patent application Ser. No. 16/667,727, filed Oct. 29, 2019, which is incorporated herein by reference.

BACKGROUND

Unless otherwise indicated herein, the materials described in this section are not prior art to the claims in this application and are not admitted to be prior art by inclusion in this section.

Optical waveguides can be used in a variety of systems, such as medical devices, manufacturing systems, and remote sensing devices (e.g., LIDARs, etc.), among other examples. In general, an optical waveguide is a device that defines an optical path for guiding an optical signal from one spatial position (where the signal enters the waveguide) to another spatial position (where the signal exits the waveguide). In one example, an optical waveguide may include an optical material having a higher refractive index relative to its surrounding medium. Due to the difference between the refractive indexes, light propagating inside the optical material (or portions thereof) may reflect at one or more walls of the optical material back into the optical material (e.g., total internal reflection (TIR)) and then continue propagating inside the optical material.

SUMMARY

In one example, a system comprises a substrate and a waveguide disposed on the substrate to define an optical path on the substrate. The waveguide is configured to guide, inside the waveguide and along the optical path, a light signal toward an edge of the waveguide. The edge defines an optical interface between the waveguide and a fluidic optical medium adjacent to the edge of the waveguide. The system also comprises an optical fluid and a fluid actuator configured to adjust a physical state of the optical fluid based on a control signal. The adjustment of the physical state of the optical fluid causes an adjustment of the fluidic optical medium adjacent to the edge.

In another example, a light detection and ranging (LIDAR) device comprises a light emitter configured to emit a light signal. The LIDAR device is configured to transmit a plurality of light beams in a relative spatial arrangement. The LIDAR device also comprises a waveguide configured to guide, inside the waveguide, the light signal toward an edge of the waveguide. The edge defines an optical interface between the waveguide and a fluidic optical medium adjacent to the edge of the waveguide. The LIDAR device also comprises an optical fluid and a fluid actuator configured to adjust a physical state of the optical fluid based on a control signal. The adjustment of the physical state of the optical fluid causes an adjustment of the fluidic optical medium adjacent to the edge. The waveguide is configured to transmit, based on the optical fluid being in a first physical state, the light signal out of the edge along a first optical path associated with a first light beam in the relative spatial arrangement. The waveguide is also configured to internally reflect, based on the optical fluid being in a second physical state, the light signal away from the edge along a second optical path associated with a second light beam in the relative spatial arrangement.

In yet another example, a method involves guiding, inside a waveguide, a light signal toward a first edge of the waveguide. The edge defines an optical interface between the waveguide and a fluidic optical medium adjacent to the first edge of the waveguide. The method also involves adjusting, via a fluid actuator, a physical state of the optical fluid based on a control signal. The adjustment of the physical state of the optical fluid causes an adjustment of the fluidic optical medium. The method also involves transmitting, based on the optical fluid being in a first physical state, the light signal out of the waveguide at the first edge. The method also involves transmitting, based on the optical fluid being in a second physical state, the light signal out of the waveguide at a second edge of the waveguide.

In still another example, a system comprises means for guiding, inside a waveguide, a light signal toward a first edge of the waveguide. The edge defines an optical interface between the waveguide and a fluidic optical medium adjacent to the first edge of the waveguide. The system also comprises means for adjusting, via a fluid actuator, a physical state of the optical fluid based on a control signal. The adjustment of the physical state of the optical fluid causes an adjustment of the fluidic optical medium. The system also comprises means for transmitting, based on the optical fluid being in a first physical state, the light signal out of the waveguide at the first edge. The system also comprises means for transmitting, based on the optical fluid being in a second physical state, the light signal out of the waveguide at a second edge of the waveguide.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
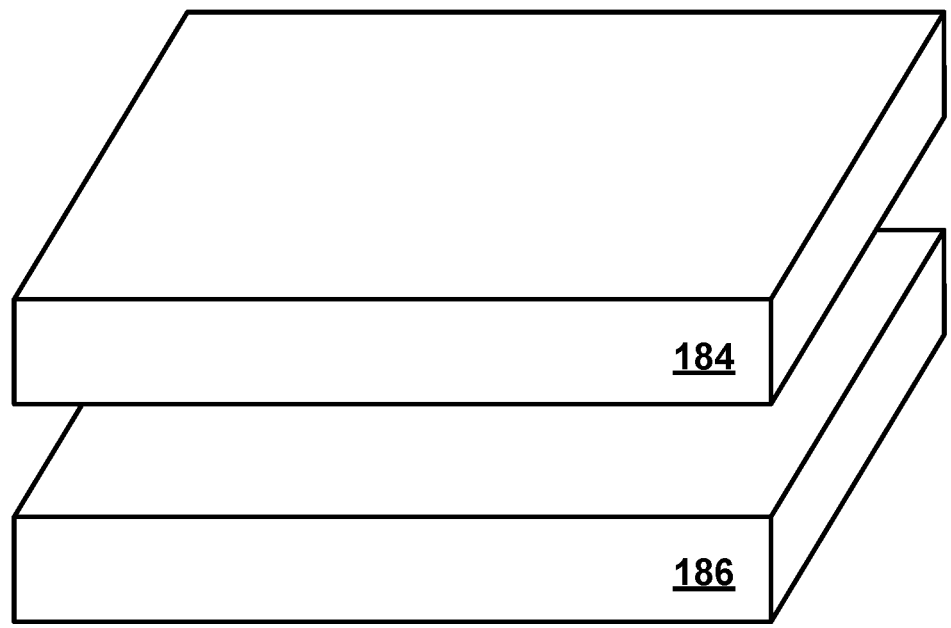
FIG. 1A illustrates an optical system, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. Overview

Some example optical systems disclosed herein can be employed for routing one or more optical signals (e.g., signal channels) in one or more reconfigurable and/or reprogrammable optical paths. One example system includes a waveguide disposed on a substrate to define an optical path of a light signal guided inside the waveguide toward an edge of the waveguide. The edge may define an optical interface between the waveguide and a fluidic optical medium (e.g., air, optical liquid, etc.) adjacent to the edge. The system may also include an optical fluid and a fluidic actuator (e.g., a microfluidic apparatus, etc.) configured to adjust a physical state of the optical fluid.

By way of example, the fluidic actuator may be configured to move an optical fluid, having a similar refractive index as a refractive index of the waveguide, between a first location inside the fluidic optical medium and a second location outside the fluidic optical medium. In a first configuration, where the optical fluid is positioned at the first location, the guided light signal may exit the waveguide at the edge due to the similar refractive indexes of the optical medium and the waveguide. In a second configuration, where the optical fluid is at the second location, the guided light signal may instead reflect at the edge (e.g., via TIR) back into the waveguide due to the difference between the respective refractive indexes of the waveguide and the fluidic optical medium (e.g., air) adjacent to the edge. Thus, in this example, the system may operate the fluidic actuator to selectively modify the optical path of the light signal.

More generally, some example systems herein may include one or more waveguides, one or more optical fluids, one or more fluidic actuators, as well as logic circuitry (and/or other types of controllers) configured to provide a control signal for operating the fluidic actuator(s). For example, an example system may optically couple different combinations of waveguides at different times during operation of the system by modulating the control signal. In turn, the fluidic actuator(s) may adjust, based on the control signal, one or more optical characteristics (e.g., refractive indexes, etc.) of one or more optical mediums adjacent to and/or interposed between the various waveguide(s). In this way, for instance, the example system could define a re-configurable and/or re-programmable optical path for routing an optical signal.

Other aspects, features, implementations, configurations, arrangements, and advantages are possible.

II. Example Systems and Devices

FIG. 1A illustrates an optical system 100, according to example embodiments. As shown, system 100 includes a plurality of substrates 184, 186 in an overlapping arrangement. It is noted that system 100 is shown to include only two overlapping substrates 184 and 186 for convenience in description. However, in alternate embodiments, system 100 could alternatively include fewer or more substrates. In one example, system 100 may be alternatively configured as a single layer optical system that includes optical components (e.g., waveguides, etc.) mounted on a single side of a single substrate. In another example, system 100 may be alternatively configured as a two-layer system that includes a single substrate, where a first layer includes components mounted on a first side of the single substrate and a second layer includes components mounted on a second side of the single substrate. Other examples are possible.

In the embodiment shown, overlapping sides (e.g., walls) of substrates 184 and 186 are arranged substantially parallel to one another. In alternate embodiments however, a given substrate could instead be tilted at an offset angle relative to an adjacent substrate in the overlapping arrangement of substrates.

In some examples, the plurality of substrates of system 100 may be physically coupled to one another such that adjacent substrates are separated by at least a given separation distance. For example, system 100 may also include one or more spacing structures (not shown), such as ball bearings, optical fibers, or any other type of solid spacing structure, disposed between substrates 184 and 186 to physically separate the two substrates from one another by at least the given separation distance. The given separation distance may be any distance depending on various applications of system 100. In one embodiment, the given separation distance may be between 10 micrometers and 1 millimeter. Other separation distances are possible.

Substrates 184, 186 may include any substrate suitable for supporting one or more signal routing structures (not shown in FIG. 1A) and/or other components of system 100. In one embodiment, overlapping and/or parallel sides of substrates 184, 186 may be configured as mounting surfaces on which optical waveguides (not shown in FIG. 1A) and/or other components of system 100 are mounted. In this embodiment, the components disposed on a given mounting surface of a given substrate may correspond to a respective layer in a multi-layer assembly of components.

In some embodiments, substrates 184 and/or 186 are formed from or include a transparent or partially transparent material (e.g., glass slide, cover glass, plastic film, etc.), which is at least partially transparent to one or more wavelengths of light. For example, where system 100 is employed for routing optical signals in the infrared wavelength range, the material used may be at least partially transparent to infrared wavelengths. In various examples, other wavelengths are possible in addition to or instead of infrared wavelengths.

In alternate embodiments, substrates 184 and/or 186 could instead be formed from or include an opaque material (e.g., a semiconductor substrate such as silicon or gallium arsenide, a printed circuit board (PCB) substrate, or any other type of opaque substrate).

Figure 1B:
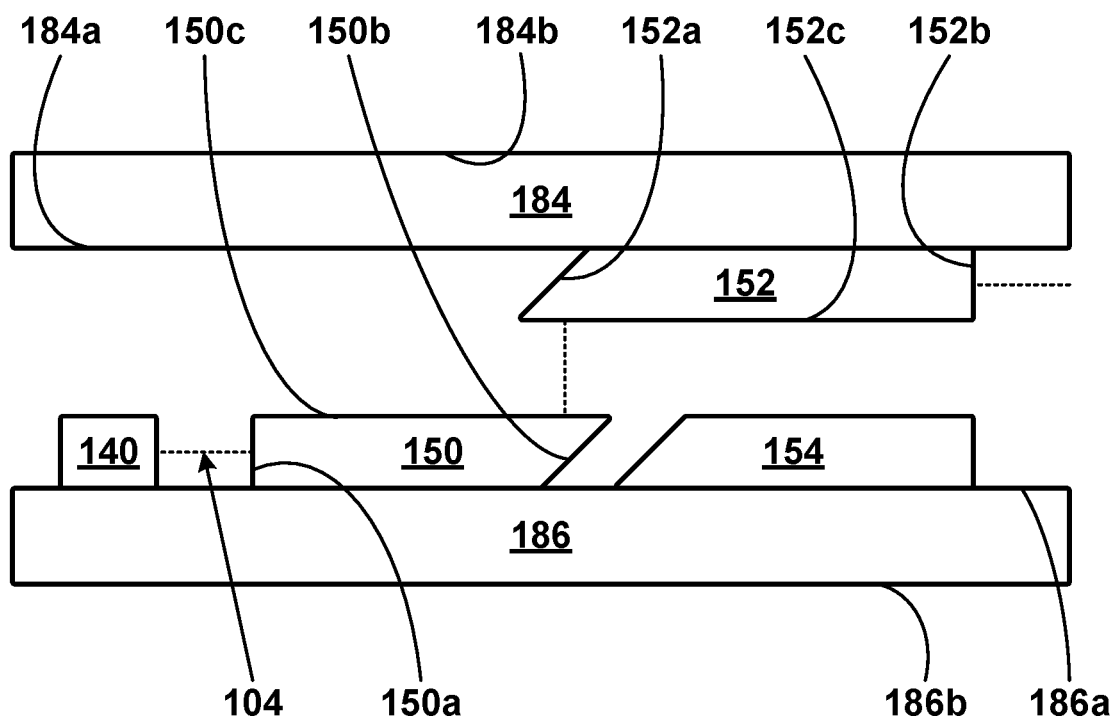
FIG. 1B illustrates a cross-section view of the system of FIG. 1A in a first configuration.

FIG. 1B illustrates a cross-section view of system 100 in a first configuration. For purposes of illustration, FIG. 1B shows x-y-z axes, where the y-axis extends through the page. As shown, system 100 also includes light emitter 140 and waveguides 150, 152, 154.

Light emitter 140 may include a laser diode, fiber laser, a light-emitting diode, a laser bar, a nanostack diode bar, a filament, a LIDAR transmitter, or any other light source. In some embodiments, emitter 140 may be implemented as a pulsed laser (as opposed to a continuous wave laser), allowing for increased peak power while maintaining an equivalent continuous power output. Other implementations are possible.

Waveguides 150, 152, 154 can be formed from a glass substrate (e.g., glass plate, etc.), a photoresist material (e.g., SU-8, etc.), or any other material at least partially transparent to one or more wavelengths of emitted light 104. As shown in FIG. 1B, one or more components (e.g., waveguide 152) are disposed on a first surface (e.g., side 184a) of substrate 184 as a first layer of multi-layer system 100, and one or more other components (e.g., waveguides 150, 154 and emitter 140) are disposed on a second surface (e.g., side 186a of substrate 186) as a second layer of optical components in the multi-layer system 100. Although not shown, in alternative examples, system 100 may include one or more layers of components mounted on other surfaces of substrates 184, 186 (e.g., sides 184b, 186b, etc.) instead of or in addition to the two layers shown. For example, system 100 may alternatively include a single substrate (184). In this example, the first layer (e.g., including waveguide 152) could instead be mounted on side 184b and the second layer (e.g., including waveguides 150, 154) could instead be mounted on side 184a. Other examples are possible.

In some embodiments, waveguides 150, 152, 154 can be formed on the respective surfaces of substrates 184, 186 using optical lithography methods. For example, a photosensitive material (e.g., photoresist, etc.) can be disposed on substrates 184, 186, exposed to patterned light, and then selectively etched to form waveguides 150, 152, 154 having the respective shapes and positions shown in FIG. 1B. In this example, the photosensitive material may be sensitive to the patterned light prior to etching and fixing the pattern (e.g., and not sensitive to light 104 after the waveguides 150, 152, 154 are etched, etc.). To that end, the photosensitive material may include SU-8 or any other photosensitive material. In some examples, the photosensitive material could be patterned to form other optical elements, such as input couplers, output couplers, and/or other optical elements in addition to or instead of waveguides 150, 152, 154. In some implementations, waveguides 150, 152, 154 may be configured as multi-mode waveguides to facilitate total internal reflection (TIR) of respective light signals guided therein. Other implementations are possible as well.

In the example shown, waveguide 150 may be configured to internally reflect light signal 104 at edge 150b (e.g., via TIR) based at least in part on a first refractive index of an optical material (e.g., SU-8, etc.) of waveguide 150 being different from a second refractive index of a fluidic optical medium (e.g., air, etc.) adjacent to edge 150b. Thus, in this example, edge 150b can be configured as a TIR mirror. For instance, a tilting angle between edge 150b and side 150c can be selected such that guided light 104 is incident on edge 150b from one or more angles-of-incidence (e.g., less than the critical angle) that would cause the incident light to be internally reflected at edge 150b toward waveguide 152. Similarly, in this example, edge 152a can be configured as a TIR mirror (e.g., edge 152a could be tilted at a suitable tilting angle for TIR of light signal 104a incident thereon).

In the example arrangement shown in FIG. 1B, emitter 140 is aligned to emit a first light signal 104 into an "input section" of waveguide 150. The input section of waveguide 150 corresponds to a section of waveguide 150 (e.g., side 150a) through which light signal 104 enters the waveguide. Further, in this example, waveguide 150 is disposed on substrate 186 and shaped to define a first optical path inside waveguide 150 for guiding light signal 104 (in the x-direction) toward edge 150b of waveguide 150. As shown, edge 150b is tilted toward substrate 184. Thus, in this example, edge 150b may be configured as a TIR mirror that reflects light signal 104 out of waveguide 150 through side 150c and toward substrate 184 (as illustrated by the dotted lines). To that end, a section of waveguide 150 through which light signal 104 exits the waveguide may be referred to herein as an "output section" of waveguide 150.

As shown, an angle between side 150c and the tilted edge 150b is an acute angle. In one embodiment, the acute tilting angle of tilted edge 150b is 45 degrees. In other embodiments, other tilting angles are possible.

As illustrated by the dotted lines in FIG. 1B, waveguide 152 receives light signal 104 at an "input section" of waveguide 152 that is spaced apart from and aligned with the output section of waveguide 150. In the example shown, the input section of waveguide 152 may correspond to a section of waveguide 152 that overlaps the output section (from which light signal 104 exits waveguide 150). In alternate examples however, the input section of waveguide 152 does not necessarily overlap waveguide 150. For instance, waveguide 150 may be configured to transmit light signal 104 in a different direction than the z-direction illustrated in FIG. 1B. In this instance, the input section of waveguide 152 may be aligned to intercept light signal 104 from waveguide 150 at a different location (e.g., depending on the location of the output section and the direction of light signal 104 exiting waveguide 150).

In the example shown, waveguide 152 is disposed on substrate 184 and shaped to define a second optical path (in the x-direction) on substrate 184. Further, as shown, waveguide 152 includes a tilted edge 152a at or near the input section of waveguide 152. To that end, edge 152a may be configured as a TIR mirror configured to re-direct light signal 104 (or portions thereof) incident thereon toward an output section of waveguide 152 (e.g., side 152b). In the example shown, the second optical path defined by waveguide 152 extends in the x-direction toward an output section of waveguide 152 (e.g., side 152b).

As shown, waveguide 154 is disposed in a same layer of system 100 as waveguide 150 (i.e., on side 186a of substrate 186). Waveguide 154 may extend (i.e., in the x-direction) to define a third optical path inside waveguide 154 on substrate 186. However, as noted above, in the first example configuration of system 100 shown in FIG. 1B, light signal 104 is internally reflected at edge 150b toward side 150c of waveguide 150 and is transmitted (as shown by the dotted lines) out of side 150c toward waveguide 152 (instead of being transmitted out of edge 150b toward waveguide 154. For instance, to facilitate TIR of light 104 at edge 150b in the first configuration shown in FIG. 1B, edge 150b may be separated from waveguide 154 by a fluidic optical medium (e.g., air, etc.) that has a relatively lower refractive index than a refractive index of an optical material (e.g., SU-8, etc.) of waveguide 150.

Thus, in the first example configuration of system 100 shown in FIG. 1B, the multi-layer optical system 100 defines a combined optical path for light signal 104 extending in the x-direction from emitter 140 to side 152b of waveguide 152.

A first part of this combined optical path is in a first layer of multi-layer system 100 (i.e., on substrate 186); and a second part of the combined optical path is in a second layer (i.e., on substrate 184). Further, in the first configuration of system 100 shown in FIG. 1B, the combined optical path does not extend through waveguide 154.

Figure 1C:
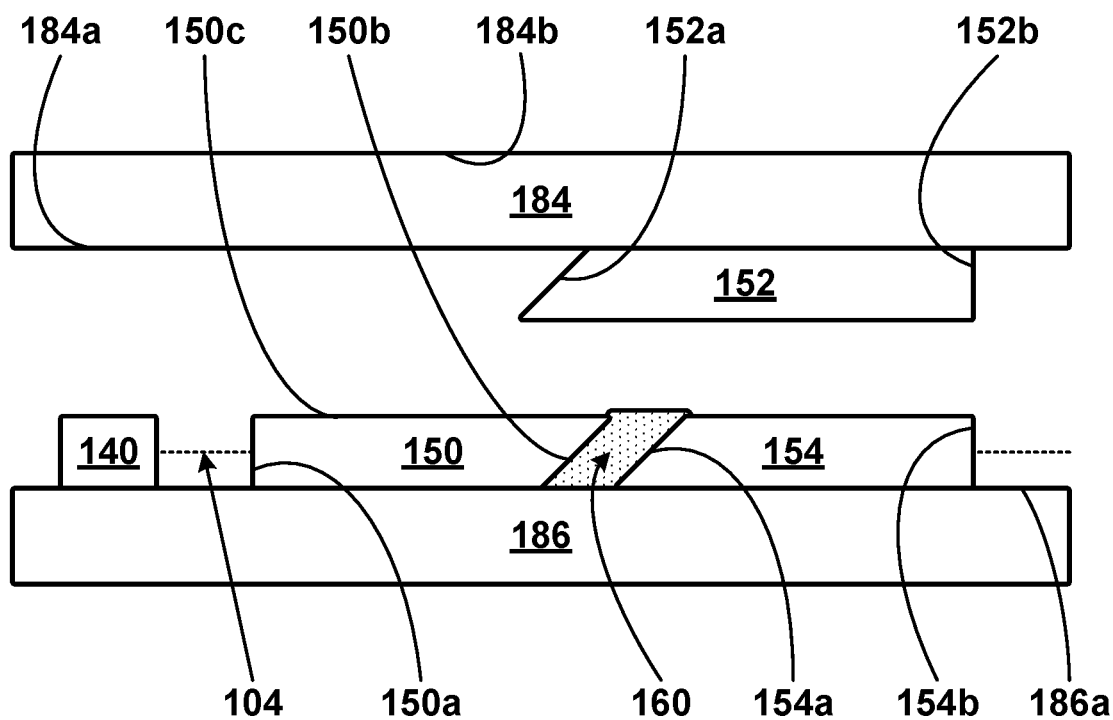
FIG. 1C illustrates a cross-section view of the system of FIG. 1A in a second configuration.

FIG. 1C illustrates a cross-section view of system 100 in a second configuration. As shown, system 100 also includes an optical fluid 160.

Optical fluid 160 may include one or more liquids or gases (i.e., fluids) that are configured to be removably disposed adjacent to edge 150 of waveguide 150 and/or edge 154*a* of waveguide 154 (and/or otherwise manipulated to modify optical characteristics of the fluidic optical medium in the space between edge 150*b* and edge 154*a*). A non-exhaustive list of example optical fluids includes glycols, silicon oils, among others.

In some examples, optical fluid 160 can be moved between a first location adjacent to edge 150*b* and/or 154*a* (e.g., into the fluidic optical medium between waveguides 150 and 154) and a second location (not shown) out of the fluidic optical medium between the waveguides. In the second configuration of system 100 shown in FIG. 1C for instance, the optical fluid 160 may be positioned at the first location (i.e., in the space between the two waveguides 150, 154). Whereas, in the first configuration of system 100 shown in FIG. 1B for instance, the optical fluid 160 (not shown in FIG. 1B) is removed from the first location (i.e., removed from the space between the two waveguides 150, 154).

In a first example, optical fluid 160 may include an at least partially transparent fluid (e.g., SU-8 in liquid form, etc.) having a higher index of refraction than air. In this example, the optical fluid 160 can be disposed adjacent to edge 150*b* and 154*a* as shown in FIG. 1C to optically couple light signal 104 from waveguide 150 to waveguide 154. For instance, due to the higher refractive index of optical fluid 160, light signal 104 may be transmitted out of waveguide 150 at edge 150*b* toward edge 154*a* of waveguide 154. As a result, in the second configuration of system 100 shown in FIG. 1C, the combined optical path of light signal 104 (shown using the dotted lines) may extend from emitter 140, waveguide 150, optical fluid 160, waveguide 154, and out of waveguide 154 at side 154*b*. Whereas, in the first configuration of system 100 shown in FIG. 1B, the combined optical path of light signal 104 instead extends from emitter 140 to side 152*b* of waveguide 152. Thus, in the first example, system 100 (or a portion thereof) may be configured as an optical channel selector that selects one of multiple optical paths for optical signal 104 by manipulating optical fluid 106.

In a second example, optical fluid 160 may alternatively or additionally include an opaque material (e.g., black carbon liquid solution, etc.) that at least partially attenuates one or more wavelengths of light signal 104. In this example, light signal 104 (or a portion thereof) may be at least partially attenuated at edge 150*b* such that a smaller portion of (or none of) light 104 is transmitted from waveguide 150 to waveguide 154 (and/or a smaller portion of or none of the light 104 is reflected at edge 150*b* toward waveguide 152). Thus, in the second example, system 100 (or a portion thereof) may be configured as an optical signal attenuator by manipulating the optical fluid to adjust a transparency characteristic of the fluidic optical medium adjacent to edge 150*b* (and/or 154*a*).

In a third example, optical fluid 160 may alternatively or additionally include an optical filtering fluid (e.g., colored liquid solution, etc.) configured to selectively transmit a portion of light signal 104 from waveguide 150 to waveguide 154. Thus, in the third example, system 100 (and/or a portion thereof) may be configured as an optical filter by manipulating the optical fluid 160 to optically filter one or more wavelengths of light 104 at edge 150.

In a fourth example, optical fluid 160 may alternatively or additionally include an optical polarizer fluid (e.g., ionic solution that is manipulated using an electric field, etc.) configured to selectively transmit light from waveguide 150 to waveguide 154 based on a polarization direction (e.g., vertical, horizontal, etc.) of the selectively transmitted light 104. Thus, in the fourth example, system 100 (and/or a portion thereof) may be configured as an optical polarization direction filter. Other examples are possible.

Figure 1D:
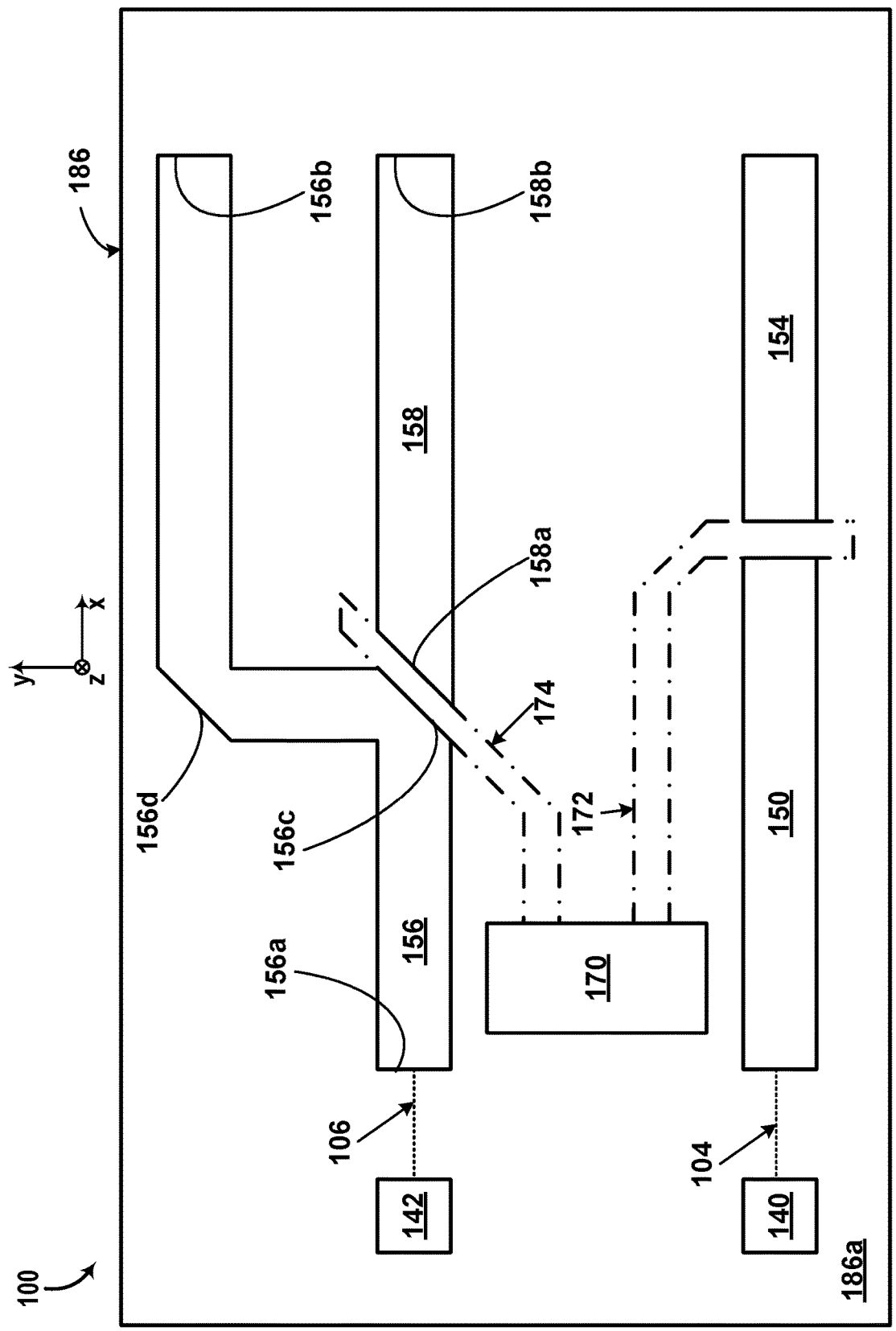
FIG. 1D illustrates another cross-section view of the system of FIG. 1A.

FIG. 1D illustrates another cross section view of system 100. For purposes of illustration, x-y-z axes are shown in FIG. 1D, where the z-axis extends through the page. For example, in the cross-section view of system 100 shown in FIG. 1D, side 186*a* of substrate 186 may be parallel to the surface of the page.

As shown, system 100 includes one or more additional components disposed on side 186*a* of substrate 186. In particular, as shown, system 100 also includes a light emitter 142, waveguides 156, 158, fluidic actuator 170, and fluid transport channels 172, 174 (depicted using dot-dash-dot lines for clarity).

In one specific implementation, optical fluid 160 (shown in FIG. 1C) is transported inside fluid channel 172 into the optical fluidic medium interposed between edges 150*b*, 154*a* in response to fluidic actuator 170 receiving a first control signal (e.g., electrical signal from a controller (not shown), etc.), and the optical fluid is moved out of the fluidic optical medium in response to fluidic actuator 170 receiving a second (different) control signal. Similarly, in some implementations, system 100 may include another optical fluid (not shown) that is manipulated inside fluid channel 174 to adjust a fluidic optical medium between waveguides 156, 158, and thus control whether light signal 106 is transmitted or reflected at edge 156*c*. Other implementations are possible.

Light emitter 142 is configured to emit the second light signal 106. Light emitter 142 may include any type of light source and may be similar to light emitter 140.

Waveguides 156, 158 may be formed similarly to any of waveguides 150, 154 and configured to define one or more reconfigurable optical paths for light signal 106. For example, as shown in FIG. 1D, waveguide 156 may receive light signal 106 at input side 156*a*, and then guide the received light signal toward tilted edge 156*c* (which may be similar to tilted edge 150*b* shown in FIGS. 1B-1C). Depending on a physical state of an optical fluid (not shown) transported inside fluid channel 174, tilted edge 156*c* may then: (i) transmit light signal 106 (or a portion thereof) out of waveguide 156, and/or (ii) internally reflect light signal 106 (or a portion thereof) inside waveguide 156 toward tilted edge 156*d*. In one example, where the physical state of the optical fluid inside channel 174 causes light signal 106 (or a portion thereof) to be internally reflected toward edge 156*d*, edge 156*d* may then internally reflect light signal 106 toward output side 156*b* and the output side 156*b* may then transmit light signal 106 out of the waveguide. In another example, where the physical state of the optical fluid inside channel 174 instead causes light signal 106 (or a portion thereof) to be transmitted out of edge 156*c* toward waveguide 158, waveguide 158 may then guide light signal 106 from side 158a to side 158b and then transmit light signal 106 out of side 158b of the waveguide.

Fluidic actuator 170 may include one or more components configured to manipulate one or more optical fluids (e.g., optical fluid 160 shown in FIG. 1C, etc.) inside fluid transport channels 172, 174. To that end, fluidic actuator 170 may include any combination of pumps, valves, tanks, electrodes, microfluidic systems, optofluidic systems, and/or any other component suitable for moving and/or otherwise manipulating optical fluids transported inside channels 172, 174.

In a first example, actuator 170 may include one or more electrodes configured to provide and/or modulate an electric field inside fluid transport channels 172, 174 to manipulate the optical fluids transported therein. For instance, referring back to FIG. 1C, optical fluid 160 may include a dielectric liquid, an ion solution, and/or any other fluid that physically moves and/or is otherwise physically manipulated (e.g., adjusting its polarization direction, etc.) based on the electric field flowing through the optical fluid. In some instances, optical fluid 160 may have a sufficiently high surface tension to reduce bubble formation, a sufficiently high surface energy to prevent deposit of droplets on the waveguide, and/or a sufficiently low vapor pressure to avoid condensation on waveguide surfaces.

In a second example, actuator 170 may include one or more pumps and/or valves configured to adjust a flow rate of the optical fluids (thereby adjusting one or more associated optical characteristics of the fluids as well) transported in fluid transport channels 172, 174. In a third example, actuator 170 may include one or more fluid tanks and one or more valves configured to replace a first optical fluid transported inside fluid channel 174 with a second optical fluid having different optical characteristics. Other examples are possible.

It is noted that one or more components of system 100 are omitted from one or more of the illustrations in FIGS. 1A-1D for convenience in description. Additionally, it is noted that the sizes, shapes, and positions of the various components of system 100 illustrated in FIGS. 1A-1D are not necessary to scale but are illustrated as shown for convenience in description.

As noted above, an optical system such as system 100 can be employed for routing optical signals for a wide variety of devices in various technology fields, such as light detection and ranging (LIDAR) devices, medical imaging devices, data communication systems, among other examples.

Figure 2A:
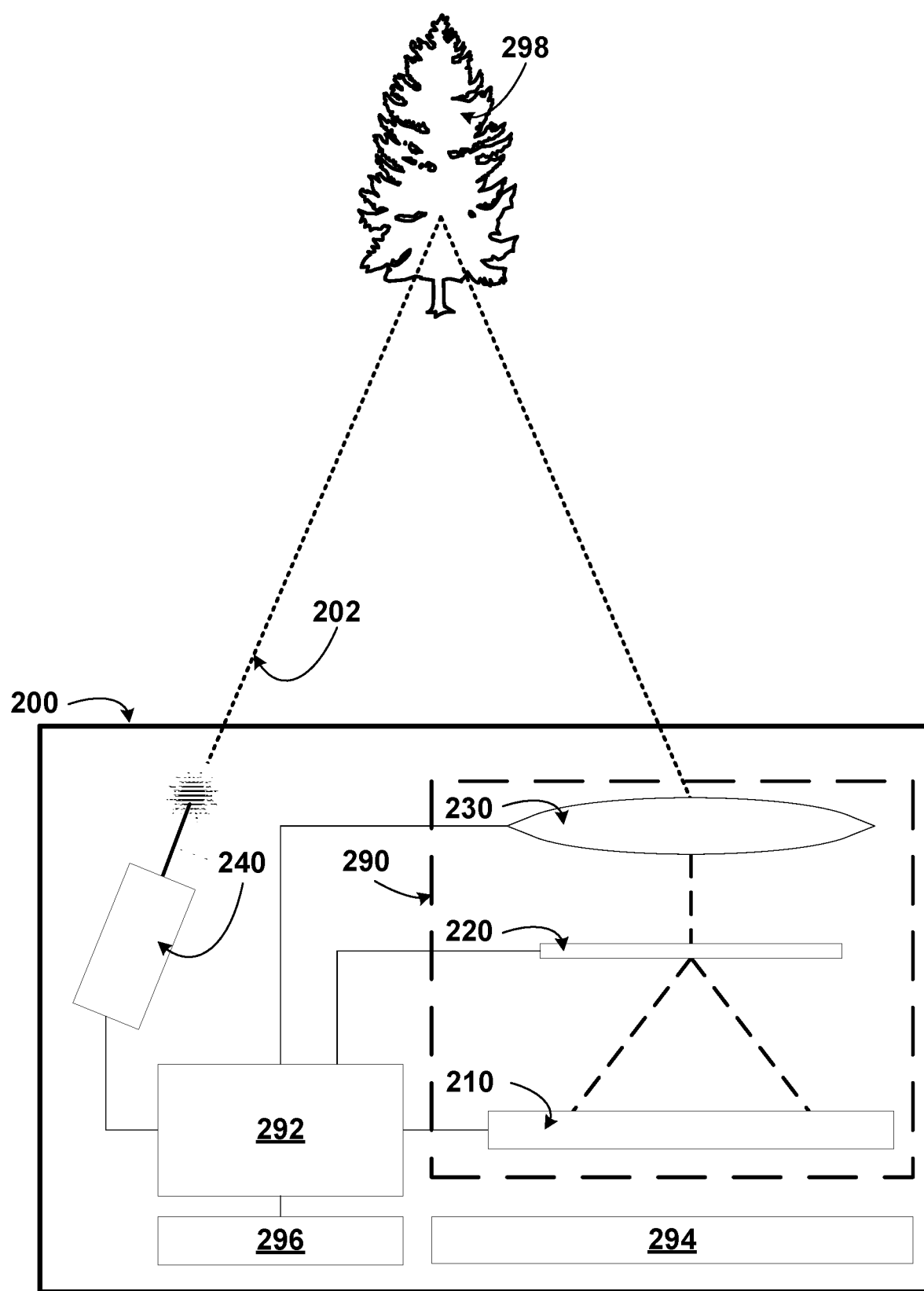
FIG. 2A is a simplified block diagram of a LIDAR device, according to example embodiments.

FIG. 2A is a simplified block diagram of a LIDAR device 200, according to example embodiments. In some examples, LIDAR device 200 can be mounted to a vehicle and employed to map a surrounding environment (e.g., a scene including object 298, etc.) of the vehicle. As shown, LIDAR 200 includes a laser emitter 240 that may be similar to emitter 140, an optical system 290, a controller 292, a rotating platform 294, and one or more actuators 296.

System 290 includes one or more light detectors 210, an opaque material 220, and a lens 230. It is noted that LIDAR device 200 may alternatively include more or fewer components than those shown, such as any of the components described for system 100 (e.g., waveguides, etc.).

Detector(s) 210 may include one or more light detectors. In one embodiment, detector(s) 210 include an array of light detectors that define a detection region for detecting the light 202 focused by lens 230. Additionally, light detector(s) 210 may include various types of light detectors, such as photodiodes, single photon avalanche diodes (SPADs), other types of avalanche photodiodes (APDs), silicon photomultipliers (SiPMs), multi-pixel photon counters (MPPCs), photoresistors, charge-coupled devices (CCDs), photovoltaic cells, and/or any other type of light detector.

Opaque material 220 (e.g., mask, aperture stop, etc.) may block a portion of light 202 returning from the scene (e.g., background light) and focused by the lens 230 from being transmitted to detector(s) 210. For example, opaque material 220 may be configured to block certain background light that could adversely affect the accuracy of a measurement performed by detector(s) 210. Alternatively or additionally, opaque material 220 may block light in the wavelength range detectable by detector(s) 210, etc. In one example, opaque material 220 may block transmission by absorbing a portion of incident light. In another example, opaque material 220 may block transmission by reflecting a portion of incident light. A non-exhaustive list of example implementations of opaque material 220 includes an etched metal, a polymer substrate, a biaxially-oriented polyethylene terephthalate (BoPET) sheet, or a glass overlaid with an opaque mask, among other possibilities. In some examples, opaque material 220 may include one or more apertures through which focused light 202 (or a portion thereof) may be transmitted through opaque material 220.

Lens 230 may focus light 202 returning from the scene toward the aperture of opaque material 220. With this arrangement, the light intensity collected from the scene, at lens 230, may be focused to have a reduced cross-sectional area over which light 202 is projected (i.e., increased spatial power density of light 202). To that end, lens 230 may include a converging lens, a biconvex lens, and/or a spherical lens, among other examples. Alternatively, lens 230 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 290 may include other optical elements (e.g., mirrors, etc.) positioned near lens 230 to aid in focusing light 202 incident on lens 230 onto opaque material 220.

Device 200 may operate emitter 240 to emit light 202 toward a scene that includes object 298. To that end, in some implementations, emitter 240 (and/or one or more other components of device 200) can be configured as a LIDAR transmitter of LIDAR device 200. Device 200 may then detect reflections of light 202 returning from the scene to determine information about object 298. To that end, in some implementations, detector(s) 210 (and/or one or more other components of system 290) can be configured as a LIDAR receiver of LIDAR device 200.

Controller 292 may be configured to control one or more components of LIDAR device 200 and to analyze signals received from the one or more components. To that end, controller 292 may include one or more processors (e.g., a microprocessor, etc.) that execute instructions stored in a memory (not shown) of device 200 to operate device 200. Additionally or alternatively, controller 292 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 292 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate between 3 Hz and 30 Hz. For example, where LIDAR 200 is configured to scan a 360° FOV at a refresh rate of 10 Hz, actuator(s) 296 may rotate platform 294 for ten complete rotations per second. Other refresh rates are possible.

Figure 2B:
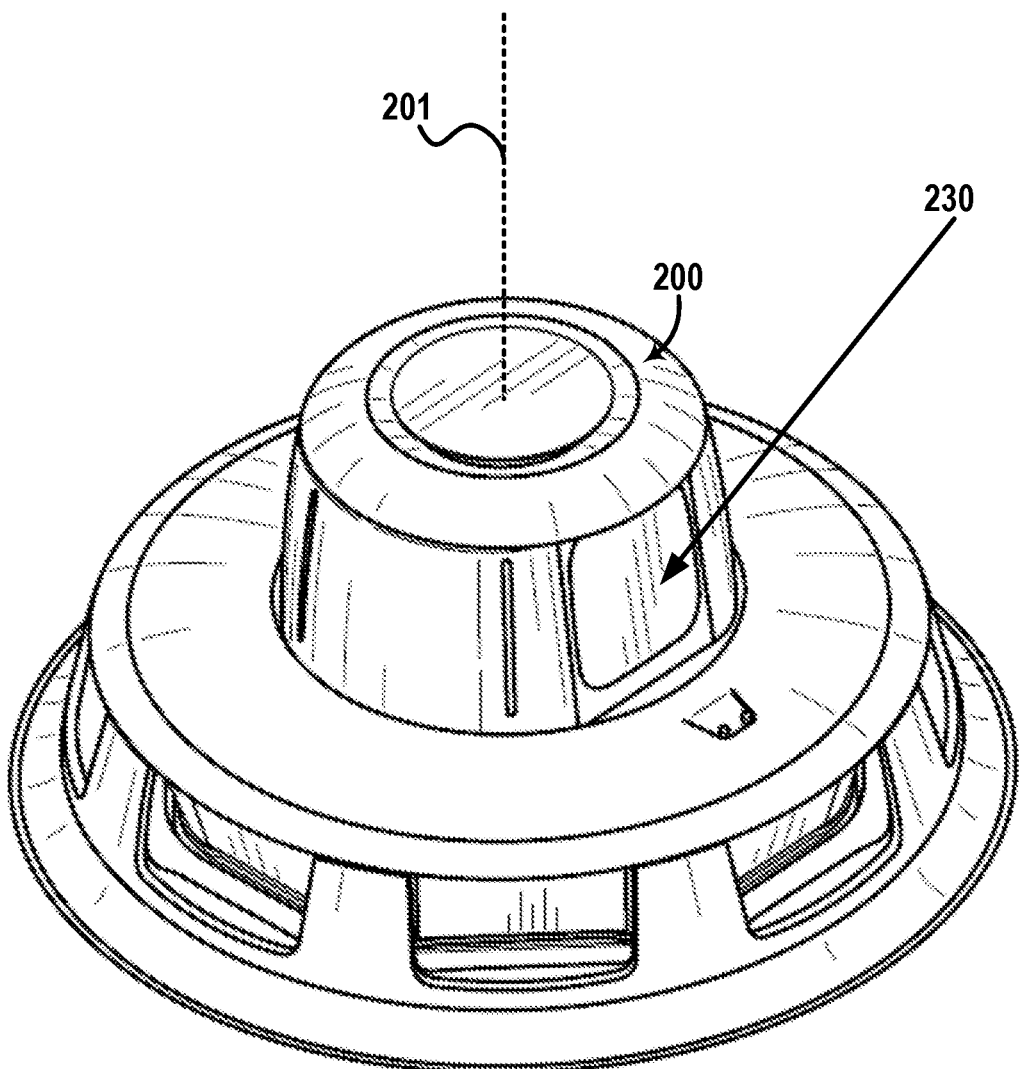
FIG. 2B illustrates a perspective view of the LIDAR device of FIG. 2A.

FIG. 2B illustrates a perspective view of LIDAR device 200. In some embodiments, device 200 may be configured to include a single shared lens 230 for both directing emitted light from emitter 240 toward the environment and focusing incident light 202 into system 290. In other embodiments, device 200 may include a separate transmitter lens (not shown) for directing the emitted light 240 different than the lens 230.

As shown in FIG. 2B, LIDAR 200 may be configured to rotate about an axis of rotation 201. In this way, LIDAR 200 can scan different regions of the surrounding environment according to different rotational positions of LIDAR 200 about axis 201. For instance, device 200 (and/or another computing system) can determine a three-dimensional map of a 360° (or less) view of the environment of device 200 by processing data associated with different pointing directions of LIDAR 200 as the LIDAR rotates about axis 201.

In some examples, axis 201 may be substantially vertical. In these examples, the pointing direction of device 200 can be adjusted horizontally by rotating system 290 (and emitter 240) about axis 201.

In some examples, system 290 (and emitter 240) can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

Returning now to FIG. 2A, in some implementations, controller 292 may use timing information associated with a signal measured by array 210 to determine a location (e.g., distance from LIDAR device 200) of object 298. For example, in embodiments where emitter 240 is a pulsed laser, controller 292 can monitor timings of output light pulses and compare those timings with timings of signal pulses measured by array 210. For instance, controller 292 can estimate a distance between device 200 and object 298 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

It is noted that the various functional blocks shown for the components of device 200 can be redistributed, rearranged, combined, and/or separated in various ways different than the arrangement shown.

Figure 3A:
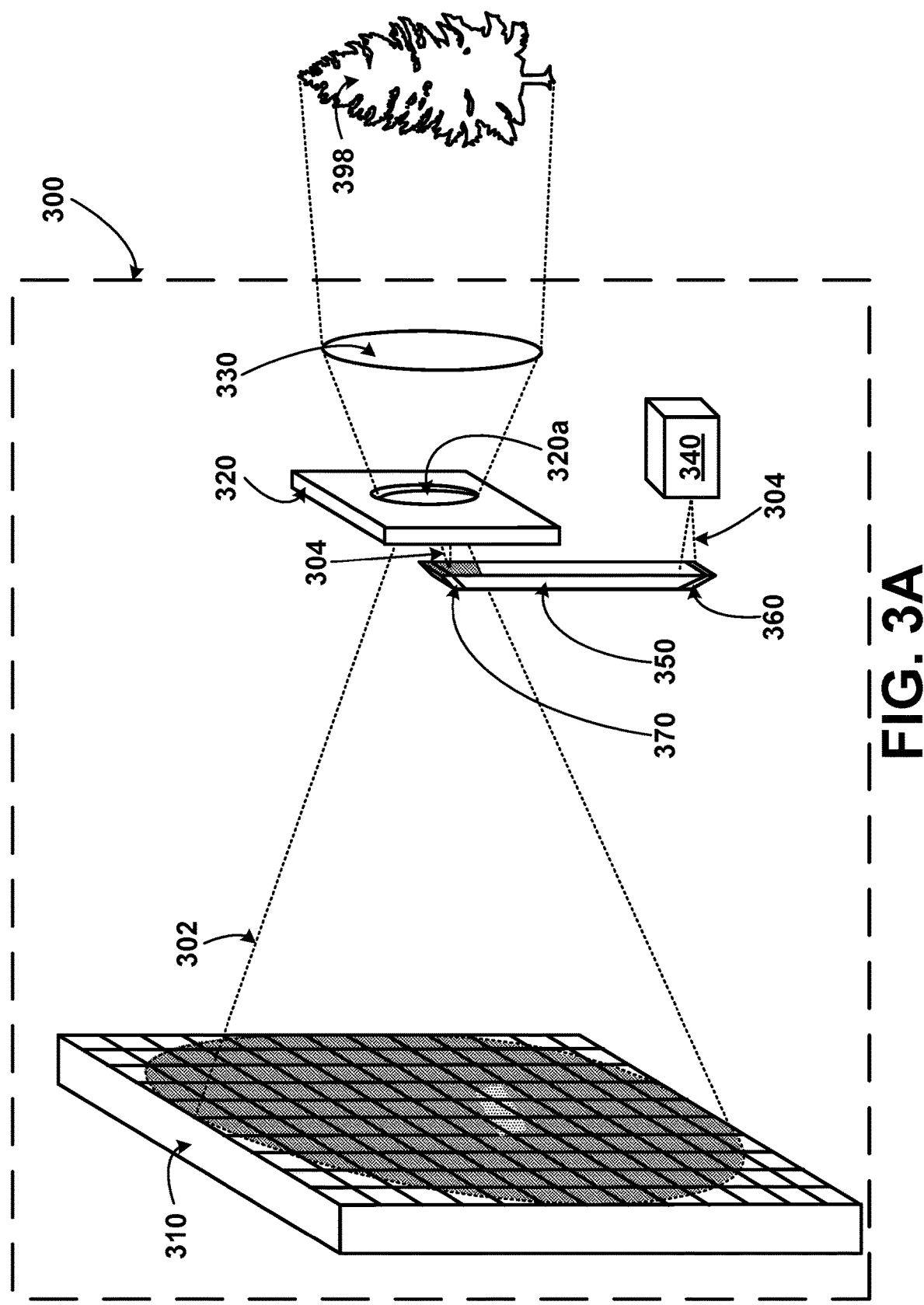
FIG. 3A is an illustration of a system that includes a waveguide, according to example embodiments.
Figure 3B:
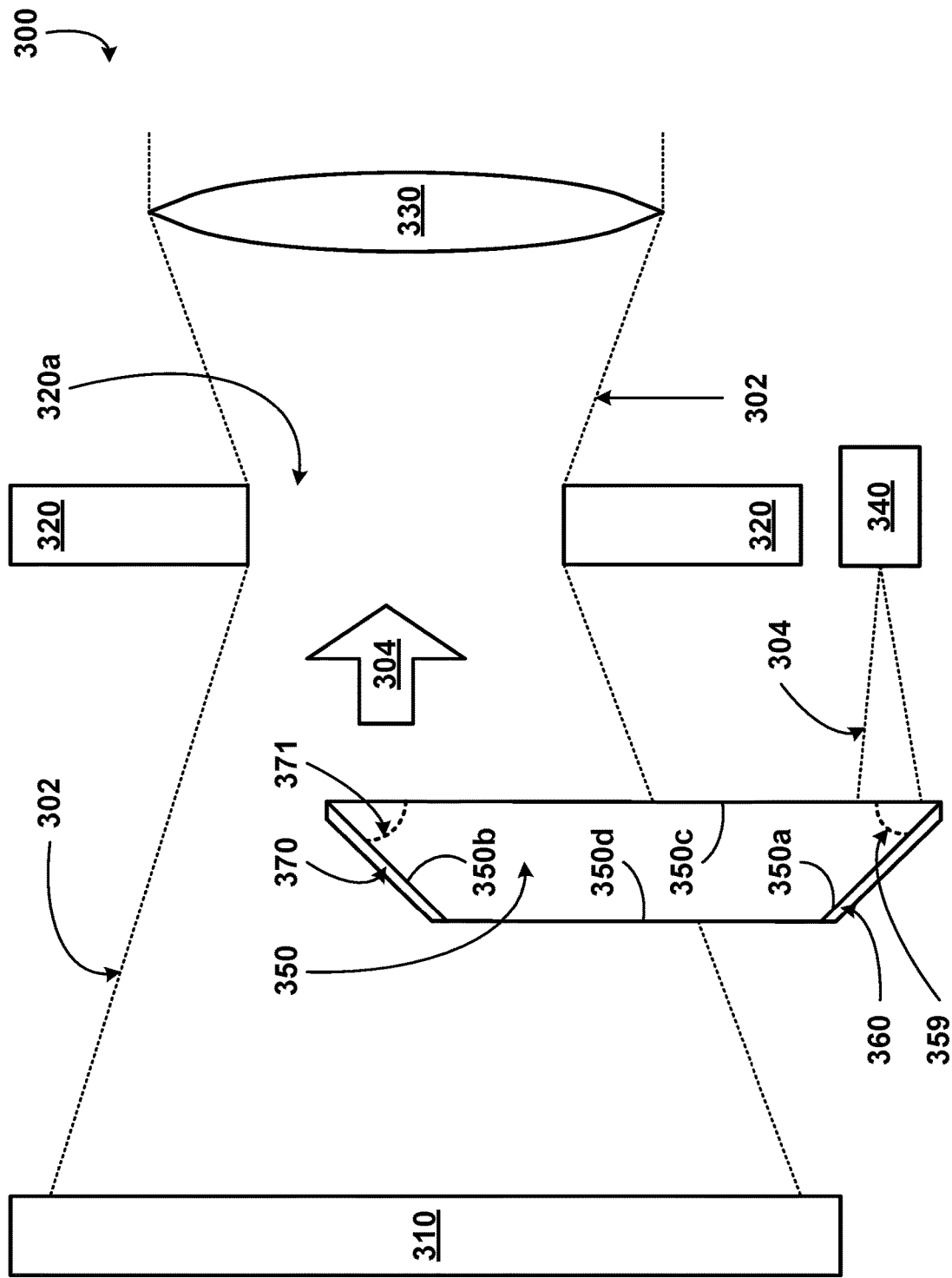
FIG. 3B illustrates a cross-section view of the system of FIG. 3A.

FIG. 3A is an illustration of a system 300 that includes a waveguide 350, according to example embodiments. FIG. 3B illustrates a cross-section view of the system 300. In some implementations, system 300 can be included in device 200 instead of or in addition to transmitter 240 and system 290. As shown, system 300 may measure light 302 reflected by an object 398 within a scene similarly to, respectively, device 200, light 202, and object 298. Further, as shown, system 300 includes a light detector array of light detectors 310, an opaque material 320, a lens 330, and a light source 340, which may be similar, respectively, to detector(s) 210, material 220, lens 230, and emitter 240.

As shown, system 100 also includes an aperture 320a defined within opaque material 320. For the sake of example, aperture 320a is shown to have an elliptical shape. However, other aperture shapes are possible (e.g., circular, rectangular, or any other shape). Aperture 320a provides a port within opaque material 320 through which light may be transmitted. Aperture 320a may be defined within opaque material 320 in a variety of ways. In one example, opaque material 320 (e.g., metal, etc.) may be etched to define aperture 320a. In another example, opaque material 320 may be configured as a glass substrate overlaid with a mask, and the mask may include a gap that defines aperture 320a (e.g., via photolithography, etc.). In various embodiments, aperture 320a may be partially or wholly transparent, at least to wavelengths of light that are detectable by light detector array 310. For example, where opaque material 320 is a glass substrate overlaid with a mask, aperture 320a may be defined as a portion of the glass substrate not covered by the mask, such that aperture 320a is not completely hollow but rather made of glass. Thus, in some instances, aperture 320a may be partially, but not entirely, transparent to one or more wavelengths of light 302. Alternatively, in some instances, aperture 320a may be formed as a hollow region of opaque material 320. Other aperture implementations are possible.

As shown, system 300 also includes waveguide 350 (e.g., optical waveguide, etc.), which may be similar to any of waveguides 150, 151, and/or 152. As shown, system 300 also includes an input mirror 360 and an output mirror 370, which may be similar to any of mirrors 160 and/or 161.

In the example shown, waveguide 350 is positioned between opaque material 320 and array 310. However, in other examples, opaque material 320 can be instead positioned between waveguide 350 and array 310. As shown, waveguide 350 may be arranged such that a portion of waveguide 350 extends into a propagation path of focused light 302, and another portion of waveguide 350 extends outside the propagation path of focused light 302. As a result, a first portion of focused light 302 transmitted through aperture 320a may be projected onto waveguide 350 (as illustrated by the shaded region on the surface of waveguide 350).

As best shown in FIG. 3B, a second portion of focused light 302 may propagate from lens 330 to array 310 without propagating through waveguide 350.

In some instances, at least part of the first portion of focused light 302 (projected onto waveguide 350) may propagate through transparent regions of waveguide 350 (e.g., from side 350c to side 350d and then out of waveguide 350 toward array 310, without being intercepted by mirror 370. However, in some instances, the first portion of focused light 302 may be at least partially intercepted by mirror 370 and then reflected away from array 310 (e.g., guided inside waveguide 350, etc.).

To mitigate this, in some examples, mirror 370 can be configured to have a small size relative to aperture 320a and/or relative to a projection area of focused light 302 at the location of mirror 370. In these examples, a larger portion of focused light 302 may propagate adjacent to mirror 370 (and/or waveguide 350) to continue propagating toward array 310. Alternatively or additionally, in some examples, mirror 370 can be formed from a partially or selectively reflective material (e.g., half mirror, dichroic mirror, polarizing beam splitter, etc.) that transmits at least a portion of focused light 302 incident thereon through mirror 370 for propagation toward array 310. Thus, in these examples as well, a larger amount of focused light 302 may eventually reach array 310.

In some examples, input mirror 360 may be configured to direct emitted light 304 (intercepted by mirror 360 from emitter 340) into waveguide 350. Waveguide 350 then guides light 304 inside waveguide 350 toward output mirror 370. Output mirror 370 may then reflect guided light 304 out of waveguide 350 and toward aperture 320a.

As best shown in FIG. 3B for example, input mirror 360 may be tilted at an offset angle 359 toward side 350c of waveguide 350. For example, an angle between mirror 360 and side 350c may be less than an angle between mirror 360 and side 360d. In one implementation, offset or tilting angle 359 of mirror 360 is 45°. However, other angles are possible. In the embodiment shown, input mirror 360 is disposed on side 350a of waveguide 350. Thus, in this embodiment, emitted light 304 may propagate into waveguide 350 through side 350c and then out of side 350a toward mirror 360. Mirror 360 may then reflect light 304 back into waveguide 350 through side 350a at a suitable angle of entry so that waveguide 350 can then guide light 304 toward side 350b. For example, waveguide 350 can be formed such that angle 359 between sides 350a and 350c is less than the angle between side 350a and side 350d (i.e., side 350a tilted toward side 350c). Input mirror 360 can then be deposited onto side 350a (e.g., via chemical vapor deposition, sputtering, mechanical coupling, or another process). However, in other embodiments, mirror 360 can be alternatively disposed inside waveguide 350 (e.g., between sides 350a and 350b), or may be physically separated from waveguide 350.

As best shown in FIG. 3B, output mirror 370 may also be tilted toward side 350c of waveguide 350. For example, an angle 371 between mirror 370 and side 350c may be less than an angle between mirror 370 and side 360d. In one implementation, offset or tilting angle 371 of mirror 370 is 45°. However, other angles are possible. Thus, in some examples, input mirror 360 may be tilted in a first direction (e.g., clockwise in the view of FIG. 3B) toward side 350c, and output mirror 370 may be tilted in a second direction (e.g., opposite to the first direction) toward side 350c. Output mirror 370 can be physically implemented in various ways similarly to mirror 360 (e.g., disposed on tilted side 350b of waveguide 350, etc.).

In some examples, waveguide 350 may be formed from a material that has a different index of refraction than that of materials surrounding waveguide 350. Thus, waveguide 350 may guide at least a portion of light propagating inside the waveguide via internal reflection (e.g., total internal reflection, frustrated total internal reflection, etc.) at one or more edges, sides, walls, etc., of waveguide 350. For instance, as shown in FIG. 3B, waveguide 350 may guide emitted light 304 (received from emitter 340) toward side 350b via internal reflection at sides 350c, 350d, and/or other sides of waveguide 350.

As shown in FIG. 3B, aperture 320a could be located adjacent to an output section of waveguide 350 to transmit light 304 toward lens 330. Lens 330 may then direct light 304 toward a scene. Emitted light 304 may then reflect off one or more objects (e.g., object 398) in the scene, and return to lens 330 (e.g., as part of light 302 from the scene). Lens 330 may then focus light 302 (which includes reflections of the emitted light 304) through aperture 320a and toward array 310.

With this arrangement, system 300 may emit light 304 from a substantially same physical location (e.g., aperture 320a) from which system 300 receives focused light 302 (e.g., aperture 320a). Because the transmit path of emitted light 304 and the receive path of focused light 302 are co-aligned (e.g., both paths are from the point-of-view of aperture 320a), system 300 may be less susceptible to the effects of parallax. For instance, data from a LIDAR device that includes system 300 could be used to generate a representation of the scene (e.g., point cloud) that is less susceptible to errors related to parallax.

It is noted that the sizes, positions, orientations, and shapes of the components and features of system 300 shown are not necessarily to scale, but are illustrated as shown only for convenience in description. It is also noted that system 300 may include fewer or more components than those shown, and one or more of the components shown could be arranged differently, physically combined, and/or physically divided into separate components.

In a first embodiment, waveguide 350 can alternatively have a cylindrical shape or any other shape. Additionally, in some examples, waveguide 350 can be implemented as a rigid structure (e.g., slab waveguide) or as a flexible structure (e.g., optical fiber). In a second embodiment, waveguide 350 may have a curved shape or other type of shape instead of the vertical rectangular configuration shown in FIGS. 3A and 3B. In a third embodiment, waveguide 350 can be alternatively implemented without a tilted edge 350a. For example, side 350a can be at a same (e.g., perpendicular, etc.) angle relative to sides 350c and 350d. In a fourth embodiment, mirrors 360, 370 can be omitted from system 300, and waveguide 350 can instead be configured to perform the functions described above for mirrors 360, 370. For example, sides 350a and 350b of waveguide 350 can be implemented as TIR mirrors that reflect light 304 into or out of waveguide 350.

Figure 4A:
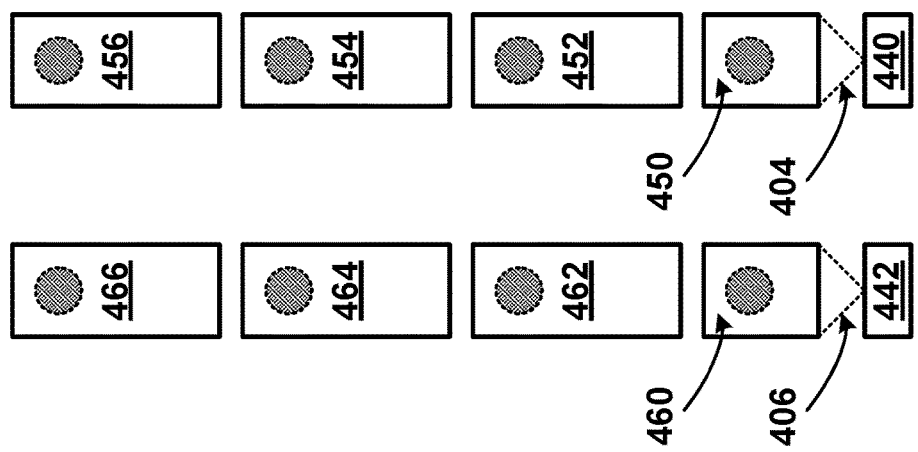
FIG. 4A illustrates a first cross-section view of a system that includes a waveguide assembly, according to example embodiments.
Figure 4A:
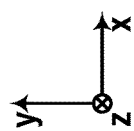

FIG. 4A illustrates a first cross-section view of a system 400 that includes multiple waveguides, according to example embodiments. For purposes of illustration, FIG. 4A shows x-y-z axes, where the z-axis extends through the page. System 400 may be similar to systems 100, 290, and/or 300, and can be used with LIDAR device 200 instead of or in addition to system 290 and transmitter 240.

As shown, system 400 includes transmitters 440, 442, each of which may be similar to emitters 140 and/or 142, and a plurality of waveguides 450, 452, 454, 456, 460, 462, 464, 466, each of which may be similar to waveguides 150 and/or 154. In some examples, the optical components of system 400 shown in FIG. 4A may correspond to a first layer of optical components disposed on a same side of a substrate (e.g., substrate 186). For example, each of the sides of waveguides 450, 452, 454, 456, 460, 462, 464, 466 extending along the surface of the page in FIG. 4A may be similar to side 150c of waveguide 150 (shown in FIG. 1B).

In the example shown, transmitter 440 emits a first light signal 404, and transmitter 442 emits a second light signal 406. Waveguide 450 receives and guides a light signal 404 in the +y-direction toward a tilted edge (not shown) of waveguide 450 similar to tilted edge 150b of waveguide 150. Although not shown, system 400 may also include one or more additional components (e.g., similar to fluidic actuator 170, fluid transport channel 172, etc.) configured to manipulate an optical fluid (e.g., similar to optical fluid 160) to adjust a fluidic optical medium in the space between waveguides 450 and 452, in line with the discussion in FIGS. 1B-1D. For instance, in a first configuration (e.g., similar to the first configuration described for system 100 in FIG. 1B), system 400 may remove the optical fluid from the space between waveguides 450 and 452 thus causing waveguide 450 to direct light signal 404 out of waveguide 450 in the +z-direction out of the page at a first output location (depicted in FIG. 4A by the shaded circle in waveguide 450). Alternatively, in a second configuration (e.g., similar to the second configuration described for system 100 in FIG. 1C), system 400 may position the optical fluid between waveguides 450 and 452 thus causing waveguide 450 to transmit optical signal 404 in the +y-direction out of waveguide 450 and toward waveguide 452. Similarly, waveguides 452, 454 (and/or waveguides 454, 456) can be selectively optically coupled (e.g., by transporting an optical fluid similar to optical fluid 160 into or out of the space between the two waveguides).

With this arrangement, system 400 may be configured to selectively route light signal 404 emitted from emitter 440 to any of the output locations depicted in FIG. 4A by the shaded circles in waveguides 450, 452 454, 456. For example, although not shown, system 400 may include a controller (e.g., similar to controller 292 shown in FIG. 2A) configured to operate one or more fluidic system components (e.g., similar to optical fluid 160, fluidic actuator 170, fluid transport channels 172, 174, etc.) to selectively optically couple one or more of the waveguides and thus reconfigure the optical path of light signal 404 using various waveguide combinations, in line with the discussion above.

Similarly, light emitter 442 may emit light signal 406 into waveguide 460, and system 400 may then selectively route optical signal 406 out of any of waveguides 460, 462, 464, 466 (e.g., in the +z-direction or out of the page) at one of the respective output locations depicted by the shaded circles in waveguides 460, 462, 464, 466.

Figure 4B:
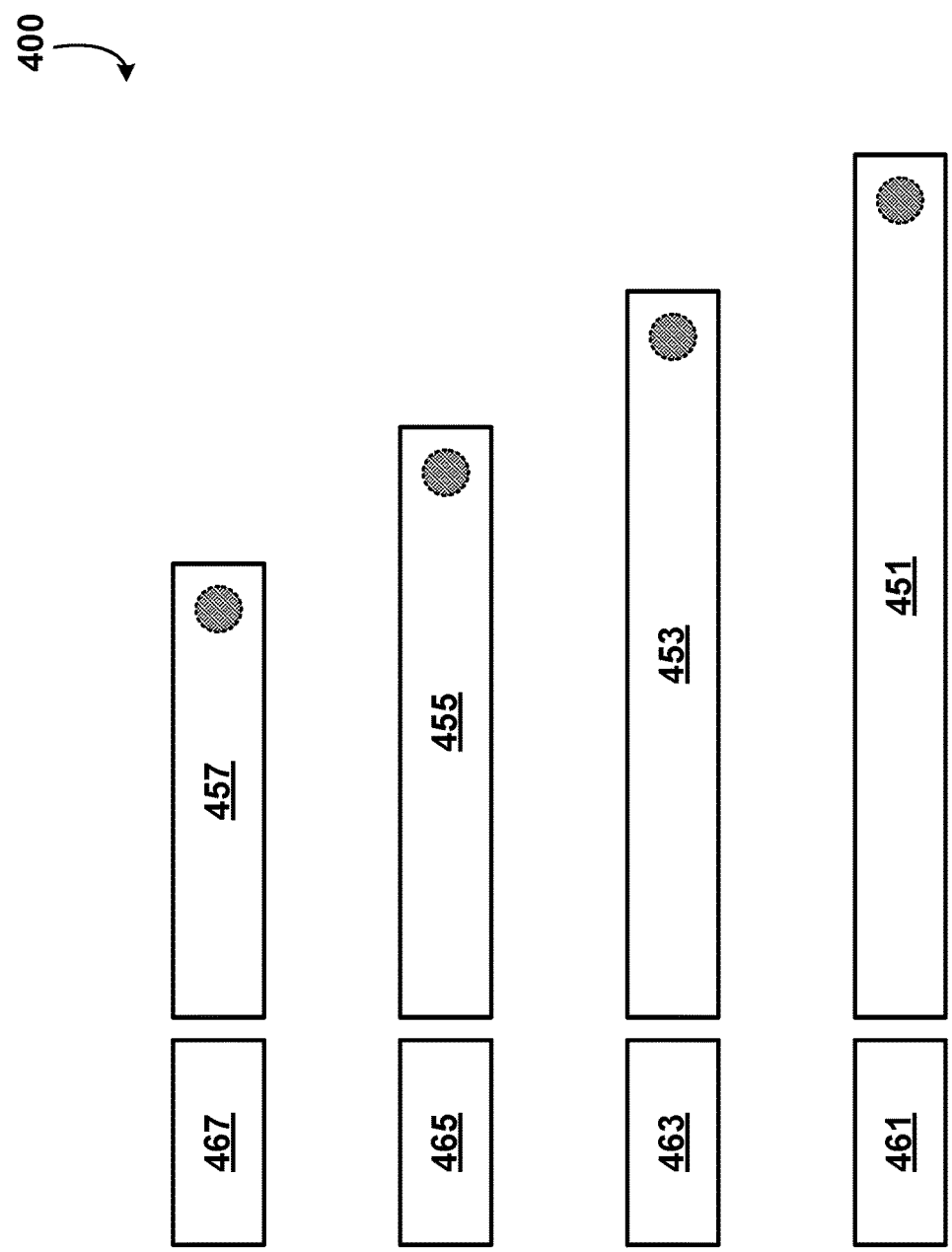
FIG. 4B illustrates a second cross-section view of the system of FIG. 4A.

FIG. 4B illustrates a second cross-section view of system 400, where the z-axis extends through the page. As shown in FIG. 4B, system 400 also includes waveguides 451, 453, 455, 457, 461, 463, 465, 467, each of which may be similar to waveguide 151 of system 100. To that end, the optical components of system 400 shown in FIG. 4B may correspond to a second layer of optical components that overlaps the first layer of optical components shown in FIG. 4A.

By way of example, referring back to FIG. 1B, the optical components of system 400 shown in FIG. 4A could be disposed on surface 186a of substrate 186; and the optical components of system 400 shown in FIG. 4B could be disposed on surface 184a of substrate 184. In this example, the side of waveguide 451 along the surface of the page in FIG. 4B may be similar to a side of waveguide 151 that is disposed on substrate 184 in FIG. 1B. In alternative examples, in line with the discussion in the description of system 100, the first layer and/or the second layer of system 400 can be instead disposed on any other sides of the substrates 184, 186.

Waveguides 451, 453, 455, 457 may be configured to guide a light signal therein in the +x-direction toward respective output locations of the waveguides (depicted in FIG. 4B as the shaded regions of each waveguide. Additionally, each of the waveguides may be aligned with a respective output location of a respective waveguide of waveguides 450, 452, 454, 456. Referring back to FIG. 4A for example, the output location (shaded circle) of waveguide 450 may be aligned with a input edge of waveguide 451. For instance, if light signal 404 is transmitted from the output location of waveguide 450, then waveguide 451 receives light signal 404 and transmits signal 404 out of waveguide 451 (in the +z-direction out of the page) at the output location of waveguide 451 (shaded circle shown in FIG. 4B).

Similarly, the output locations of waveguides 460, 462, 464, 466 (shown in FIG. 4A) may be aligned, respectively, with inputs of waveguides 461, 463, 465, 467 (shown in FIG. 4B). Further, although not shown in FIG. 4B, system 400 may also include fluidic manipulation components (e.g., similar to fluidic actuator 170, fluid transport channels 172, 174, etc.) configured to transport optical fluids (e.g., optical fluid 160) to selectively couple waveguides 461, 463, 465, 467, respectively, with waveguides 451, 453, 455, 457.

Thus, with this arrangement, system 400 can route any of light signals 404 or 406 to any of the output locations (shaded regions) of waveguides 451, 453, 455, 457 by adjusting the respective physical states of optical fluids that selectively optically couple various combinations of waveguides to define a particular optical path for light signals 404 and/or 406, in line with the discussion above.

Figure 4C:
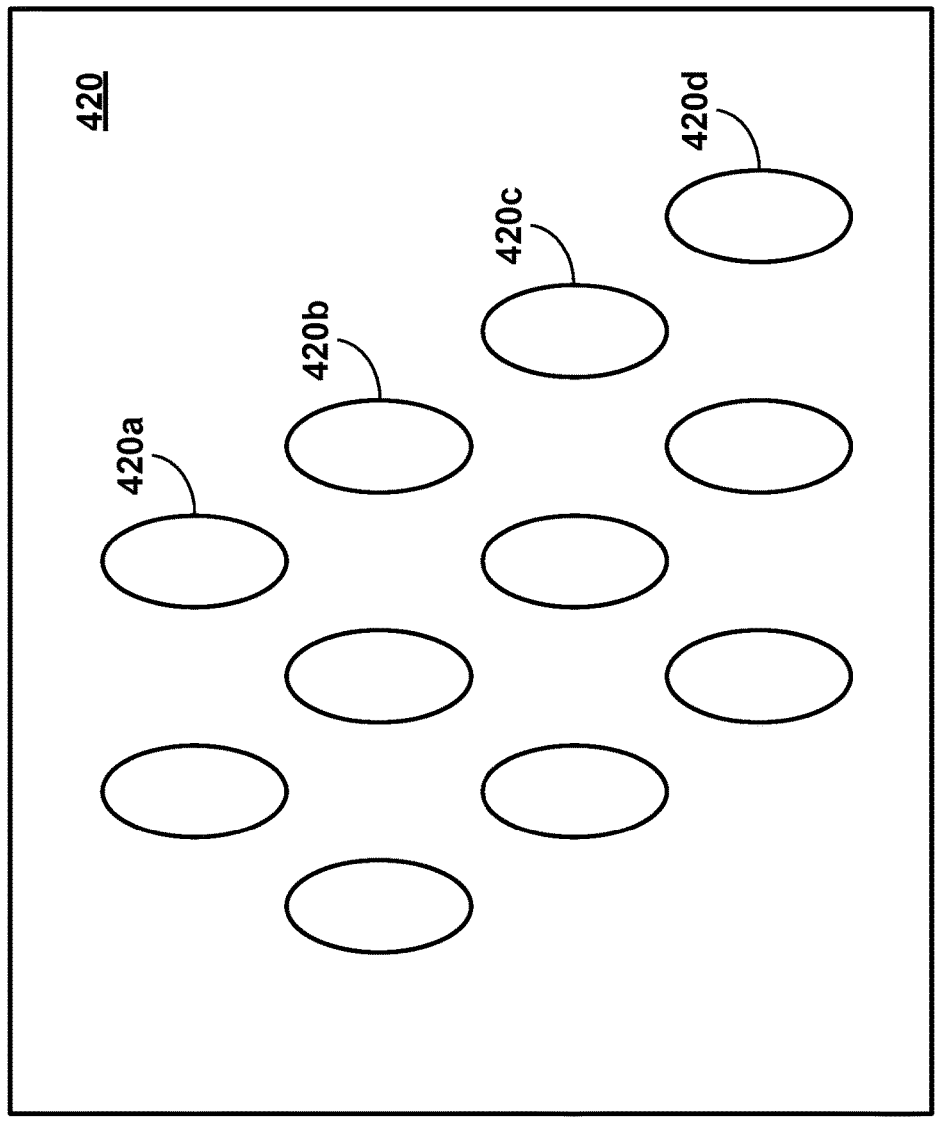
FIG. 4C illustrates a third cross-section view of the system of FIG. 4A.

FIG. 4C illustrates a third cross-section view of system 400, according to example embodiments. As shown in FIG. 4C, system 400 also includes an opaque material 420, which may be similar to opaque material 320 of system 300. As shown in FIG. 4C, opaque material 420 defines a plurality of apertures, exemplified by apertures 420a, 420b, 420c, and 420d, each of which may be similar to aperture 320a. For example, aperture 420a may be aligned with the output location of waveguide 457 similarly to, respectively, aperture 320a and output mirror 370. Similarly, aperture 420b can be aligned with the output location of waveguide 455, aperture 420c could be aligned with output location of waveguide 453, aperture 420d could be aligned with output location of waveguide 451, and so on. Thus, each aperture may be associated with a position of a respective transmit channel of system 400.

Additionally, in some examples, light from a scene (e.g., propagating into the page in FIG. 4C) could be focused onto opaque material 420, similarly to light 302 that is focused onto opaque material 320. In these examples, system 400 may thus provide multiple receive channels associated with respective portions of the focused light projected on opaque material 420 at the respective positions of apertures 420a, 420b, 420c, 420d, etc. For example, a first portion of the focused light transmitted through aperture 420a could be intercepted by a first light detector associated with a first receive channel, a second portion of the focused light transmitted through aperture 420b could be intercepted by a second light detector associated with a second receive channel, a third portion of the focused light transmitted through aperture 420c could be intercepted by a third light detector associated with a third receive channel, a fourth portion of the focused light transmitted through aperture 420d could be intercepted by a fourth light detector associated with a fourth receive channel, and so on.

Thus, with this arrangement, each transmit channel may be associated with a transmit path that is spatially co-aligned (through a respective aperture) with a receive path associated with a corresponding receive channel.

Figure 4D:
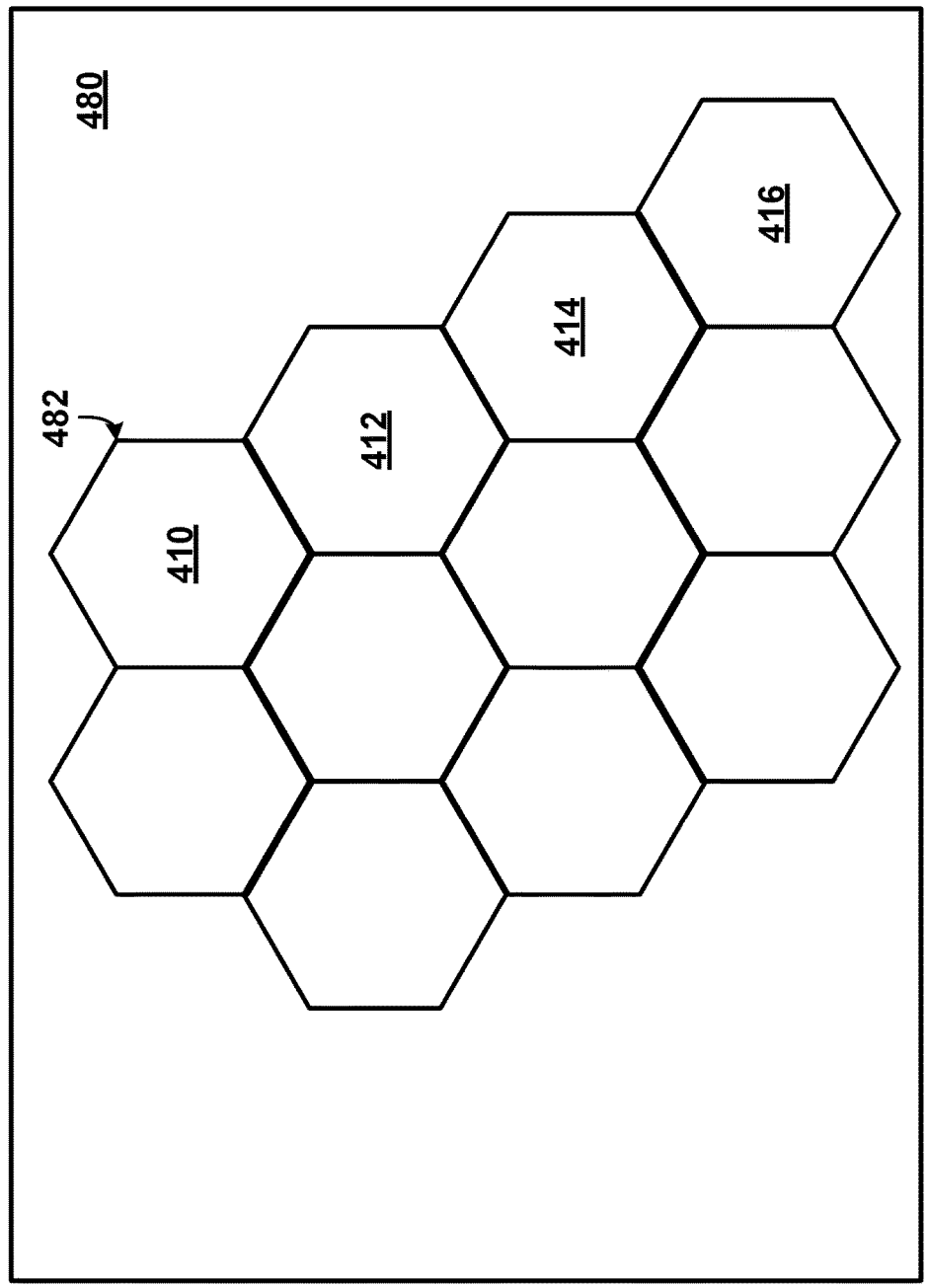
FIG. 4D illustrates a fourth cross-section view of the system of FIG. 4A.

FIG. 4D illustrates a fourth cross section view of system 400, in which the z-axis is also pointing out of the page. As shown in FIG. 4D, system 400 also includes a support structure 480 that mounts a plurality of receivers, exemplified by receivers 410, 412, 414, and 416, each of which may be similar to any of light detectors 210 and/or 310. Further, as shown, system 400 also includes one or more light shields 482.

Each of receivers 410, 412, 414, 416, etc., may include one or more light detectors. Additionally, each receiver may be arranged to intercept focused light transmitted through a respective aperture of opaque material 420 (shown in FIG. 4C). For example, receivers 410, 412, 414, 416 may be arranged to intercept focused light that is transmitted, respectively, through apertures 420a, 420b, 420c, 420d (shown in FIG. 4C). In one embodiment, receivers 410, 412, 414, 416 may be positioned to overlap (e.g., in the direction of the z-axis), respectively, output mirrors 470, 472, 474, 476.

Support Structure 480 may include a solid structure that has material characteristics suitable for supporting receivers 410, 412, 414, 416, etc. In one example, support structure 480 may include a printed circuit board (PCB) to which the light detectors of receivers 410, 412, 414, 416, 418, etc., are mounted.

Light shield(s) 482 may comprise one or more light absorbing materials (e.g., black carbon, black chrome, black plastic, etc.) arranged around receivers 410, 412, 414, 416, etc. In some examples, light shield(s) 482 may prevent (or reduce) light from external sources (e.g., ambient light, etc.) from reaching receivers 410, 412, 414, 416, etc. Alternatively or additionally, in some examples, light shield(s) 482 may prevent or reduce cross-talk between receive channels associated with receivers 410, 412, 414, 416, etc. Thus, light shield(s) 482 may also be configured to optically separate receivers 410, 412, 414, 416, etc., from one another.

Returning now to FIG. 4C, as noted above, opaque material 420 defines a grid of apertures 410, 412, 414, 416, etc. Thus, in some examples where system 400 is included in a LIDAR device, each aperture in opaque material 420 may transmit light toward a respective portion of a field-of-view (FOV) of the LIDAR and also receive reflected portions of the transmitted light returning from that same respective portion of the FOV. Thus, each aperture may be associated with a transmit/receive channel of the LIDAR. In various embodiments, system 400 may include a different number of transmit/receive channels (and thus a different number of associated apertures) than shown.

In line with the discussion above, an example LIDAR device that employs system 400 may be configured to transmit a plurality of light beams in a relative spatial arrangement toward a scene (e.g., the spatial arrangement of apertures 420a, 420b, 420c, 420d, etc., shown in FIG. 4C). Each of the transmitted light beams may correspond to a portion of (or all) the light emitted by a particular light emitter. Further, LIDAR 400 may be configured to perform a sequence of scans, where a particular light emitter can be assigned to scan a different channel in subsequent scans of the sequence. For instance, light emitter 440 can be used to scan the channel associated with aperture 420a (shown in FIG. 4C) during a first scan in the sequence and then a different channel associated with aperture 420e during a second scan in the sequence. In this way for instance, a multi-channel LIDAR device of system 400 can mitigate scanning errors (e.g., retroreflector errors associated with returning reflections from retroreflectors in the scene, etc.) by spatially varying the channels illuminated using a particular emitter during a sequence of scans of the scene by the LIDAR device.

As noted above, one example LIDAR device herein may use system 400 to transmit a plurality of light beams in a relative spatial arrangement. To that end, for example, the LIDAR device may include a first waveguide (e.g., 453) configured to transmit a first light signal (e.g., light signal 404) out of the first waveguide at a first transmit location (e.g., output of waveguide 453) of a first light beam in the relative spatial arrangement of light beams, a second waveguide (e.g., 457) configured to receive a second light signal (e.g., 406) and transmit the second light portion out of the second waveguide at a second transmit location, and so on.

In some examples, the plurality of transmitted light beams transmitted may be diverging light beams that diverge away from the LIDAR device of system 400. In these examples, the diverging light beams could thus intersect at a given distance from the LIDAR device. As best shown in FIG. 4B for example, light beams transmitted out of waveguides 455 and 457 may initially exit the LIDAR of system 400 as separate light beams that diverge away from the LIDAR and eventually intersect one another at the given distance from the LIDAR.

It is noted that the sizes, shapes, and positions shown in FIGS. 4A-4D for the various components of system 400 are not necessarily to scale but are illustrated as shown only for convenience in description.

III. Example Methods

Figure 5:
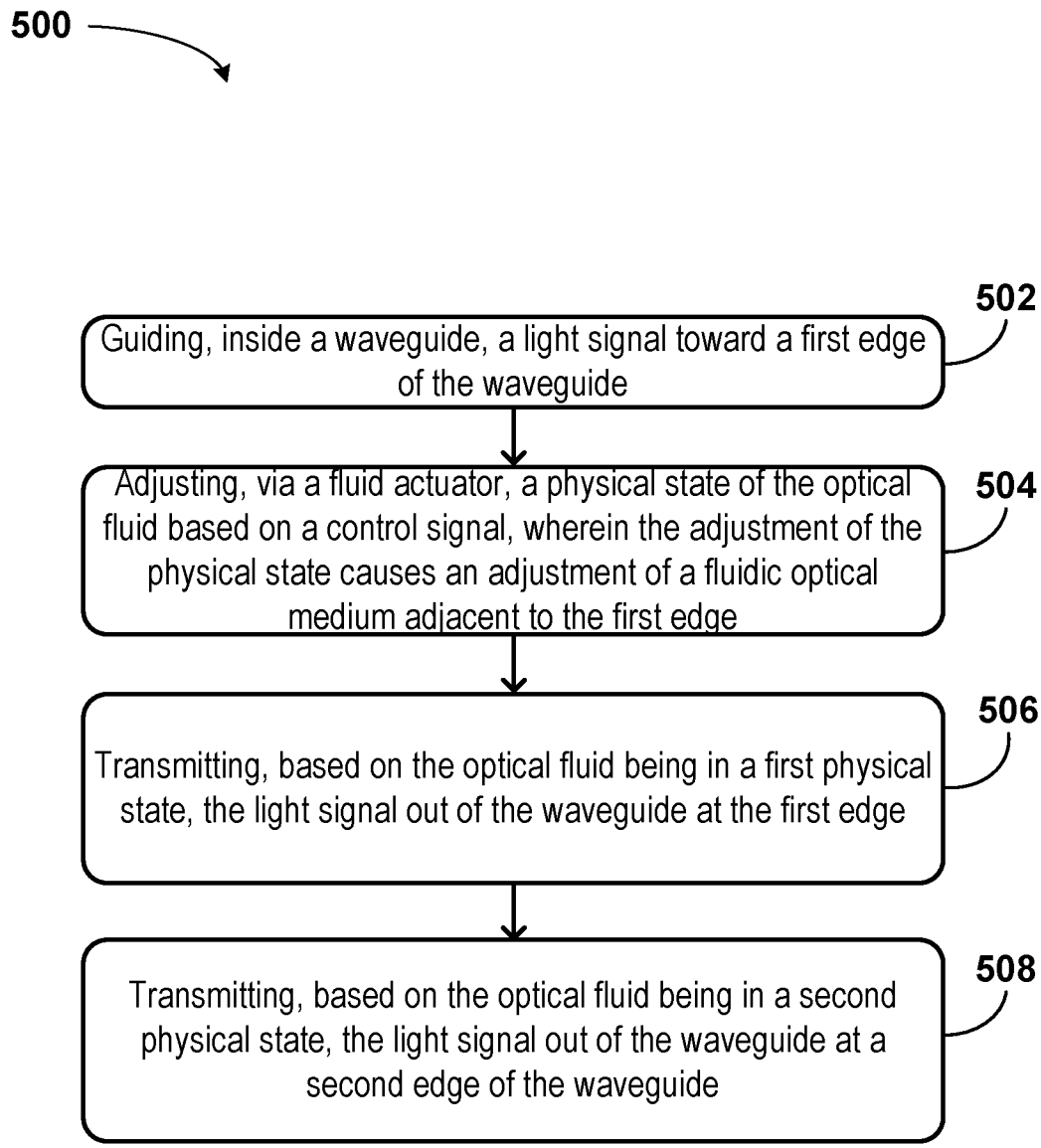
FIG. 5 is a flowchart of a method, according to example embodiments.

FIG. 5 is a flowchart of a method 500, according to example embodiments. Method 700 presents an embodiment of a method that could be used with systems 100, 290, 300, 400, and/or device 200, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves guiding, inside a waveguide (e.g., waveguide 150), a light signal (e.g., 104) toward a first edge (e.g., edge 150b) of the waveguide. The first edge may define an optical interface between the waveguide and a fluidic optical medium adjacent to the first edge of the waveguide, in line with the discussion in the description of FIG. 1B.

At block 504, method 500 involves adjusting, via a fluid actuator (e.g., fluid actuator 170), a physical state of an optical fluid (e.g., optical fluid 160) based on a control signal (e.g., controller 292 may provide the control signal to operate fluid actuator 170). The adjustment of the physical state of the optical fluid may cause an adjustment of the fluidic optical medium. For example, the fluidic actuator may transport the optical fluid to a first location outside the fluidic optical medium (similarly to the configuration shown in FIG. 1B) or to a second location inside the fluidic optical medium (similarly to the configuration shown in FIG. 1C).

At block 506, method 500 involves transmitting, based on the optical fluid being in a first physical state, the light signal out of the waveguide at the first edge. For example, in the configuration shown in FIG. 1C, light signal 104 may be transmitted out of edge 150b into the optical fluid 160.

At block 508, method 500 involves transmitting, based on the optical fluid being in a second physical state, the light signal out of the waveguide at second edge of the waveguide. For example, in the configuration shown in FIG. 1B, light signal 104 may be transmitted out of edge 150c.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
   a first waveguide;
   a second waveguide;
   a first fluid transport channel, wherein a portion of the first fluid transport channel is positioned between the first waveguide and the second waveguide;
   a first light emitter configured to emit a first light signal into the first waveguide;
   a third waveguide;
   a fourth waveguide;
   a second fluid transport channel, wherein a portion of the second fluid transport channel is positioned between the third waveguide and the fourth waveguide;
   a second light emitter configured to emit a second light signal into the third waveguide; and
   a fluid actuator configured to (i) control, using at least the first fluid transport channel, an optical path of the first light signal and (ii) control, using at least the second fluid transport channel, an optical path of the second light signal.

2. The system of claim 1, wherein the fluid actuator is configured to control the optical path of the first light signal by controlling whether the optical path of the first light signal extends into the second waveguide.

3. The system of claim 2, wherein the fluid actuator is configured to:
   move an optical fluid into the portion of the first fluid transport channel that is positioned between the first waveguide and the second waveguide, such that the optical path of the first light signal extends from the first waveguide to the second waveguide via the optical fluid; and
   move the optical fluid out of the portion of the first fluid transport channel that is positioned between the first waveguide and the second waveguide, such that the optical path of the first light signal does not extend into the second waveguide.

4. The system of claim 2, further comprising a further waveguide spaced apart from the first waveguide, wherein the fluid actuator is configured to:
   move an optical fluid into the portion of the first fluid transport channel that is positioned between the first waveguide and the second waveguide, such that the optical path of the first light signal extends from the first waveguide to the second waveguide via the optical fluid; and
   move the optical fluid out of the portion of the first fluid transport channel that is positioned between the first waveguide and the second waveguide, such that the optical path of the first light signal extends out of the first waveguide and into the further waveguide.

5. The system of claim 1, wherein the fluid actuator is configured to control the optical path of the second light signal by controlling whether the optical path of the second light signal extends into the fourth waveguide.

6. The system of claim 5, wherein the third waveguide comprises an input side, a first bend, a second bend, and an output side, wherein the fluid actuator is configured to:
   move an optical fluid into the portion of the second fluid transport channel that is positioned between the third waveguide and the fourth waveguide, such that the optical path of the second light signal extends from the input side of the third waveguide to the first bend of the third waveguide and from the first bend of the third waveguide into the fourth waveguide via the optical fluid; and move the optical fluid out of the portion of the second fluid transport channel that is positioned between the third waveguide and the fourth waveguide, such that the optical path of the second light signal extends from the input side of the third waveguide to the first bend of the third waveguide, from the first bend of the third waveguide to the second bend of the third waveguide, and from the second bend of the third waveguide to the output side of the third waveguide.

7. The system of claim 1, wherein the fluid actuator comprises one or more electrodes configured to manipulate optical fluids in the first and second fluid transport channels via an electric field.

8. The system of claim 1, wherein the fluid actuator comprises one or more pumps and/or one or more valves configured to manipulate optical fluids in the first and second fluid transport channels.

9. The system of claim 1, further comprising a controller configured to control the fluid actuator via control signals.

10. The system of claim 1, wherein the fluid actuator is configured to control the optical path of the first light signal by controlling one or more optical characteristics in the portion of the first fluid transport channel positioned between the first waveguide and the second waveguide, and wherein the fluid actuator is configured to control the optical path of the second light signal by controlling one or more optical characteristics in the portion of the second fluid transport channel positioned between the third waveguide and the fourth waveguide.

11. The system of claim 1, wherein the fluid actuator is configured to control the optical path of the first light signal by controlling a refractive index in the portion of the first fluid transport channel positioned between the first waveguide and the second waveguide, and wherein the fluid actuator is configured to control the optical path of the second light signal by controlling a refractive index in the portion of the second fluid transport channel positioned between the third waveguide and the fourth waveguide.

12. The system of claim 11, wherein the fluid actuator is configured to control the refractive index in the portion of the first fluid transport channel positioned between the first waveguide and the second waveguide by controlling whether an optical fluid is present in the portion of the first fluid transport channel between the first waveguide and the second waveguide, and wherein the fluid actuator is configured to control the refractive index in the portion of the second fluid transport channel positioned between the third waveguide and the fourth waveguide by controlling the optical fluid is present in the portion of the second fluid transport channel between the third waveguide and the fourth waveguide, wherein the optical fluid has an index of refraction that is higher than that of air.

13. The system of claim 12, wherein the optical fluid has an index of refraction such that:

when the optical fluid is not present in the portion of the first fluid transport channel between the first waveguide and the second waveguide, the first optical signal experiences total internal reflection at an edge of the first waveguide adjacent the portion of the first fluid transport channel; and when the optical fluid is present in the portion of the first fluid transport channel between the first waveguide and the second waveguide, the first optical signal does not experience total internal reflection at the edge of the first waveguide adjacent the portion of the first fluid transport channel.

14. The system of claim 12, wherein the optical fluid has an index of refraction such that:

when the optical fluid is not present in the portion of the second fluid transport channel between the third waveguide and the fourth waveguide, the second optical signal experiences total internal reflection at an edge of the third waveguide adjacent the portion of the second fluid transport channel; and when the optical fluid is present in the portion of the second fluid transport channel between the third waveguide and the fourth waveguide, the second optical signal does not experience total internal reflection at the edge of the third waveguide adjacent the portion of the second fluid transport channel.

15. A method, comprising:

emitting, by a first light emitter, a first light signal into a first waveguide, wherein a portion of a first fluid transport channel is positioned between the first waveguide and a second waveguide;

emitting, by a second light emitter, a second light signal into a third waveguide, wherein a portion of a second fluid transport channel is positioned between the third waveguide and a fourth waveguide;

controlling, by a fluid actuator and using at least the first fluid transport channel, an optical path of the first light signal; and controlling, by the fluid actuator and using at least the second fluid transport channel, an optical path of the second light signal.

16. The method of claim 15, wherein controlling the optical path of the first light signal comprises:

controlling, by the fluid actuator and using at least the first fluid transport channel, whether the optical path of the first light signal extends into the second waveguide.

17. The method of claim 15, wherein controlling the optical path of the first light signal comprises:

moving, by the fluid actuator, an optical fluid into the portion of the first fluid transport channel that is positioned between the first waveguide and the second waveguide, such that the optical path of the first light signal extends from the first waveguide to the second waveguide via the optical fluid; and moving, by the fluid actuator, the optical fluid out of the portion of the first fluid transport channel that is positioned between the first waveguide and the second waveguide, such that the optical path of the first light signal does not extend into the second waveguide.

18. The method of claim 15, wherein controlling the optical path of the first light signal comprises:

moving, by the fluid actuator, an optical fluid into the portion of the first fluid transport channel that is positioned between the first waveguide and the second waveguide, such that the optical path of the first light signal extends from the first waveguide to the second waveguide via the optical fluid; and moving, by the fluid actuator, the optical fluid out of the portion of the first fluid transport channel that is positioned between the first waveguide and the second waveguide, such that the optical path of the first light signal extends out of the first waveguide and into a further waveguide, wherein the further waveguide is spaced apart from the first waveguide.

19. The method of claim 15, wherein controlling the optical path of the second light signal comprises:

controlling, by the fluid actuator and using at least the second fluid transport channel, whether the optical path of the second light signal extends into the fourth waveguide.

20. The method of claim 15, wherein the third waveguide comprises an input side, a first bend, a second bend, and an output side, wherein controlling the optical path of the second light signal comprises:
- moving, by the fluid actuator, an optical fluid into the portion of the second fluid transport channel that is positioned between the third waveguide and the fourth waveguide, such that the optical path of the second light signal extends from the input side of the third waveguide to the first bend of the third waveguide and from the first bend of the third waveguide into the fourth waveguide via the optical fluid; and
- moving, by the fluid actuator, the optical fluid out of the portion of the second fluid transport channel that is positioned between the third waveguide and the fourth waveguide, such that the optical path of the second light signal extends from the input side of the third waveguide to the first bend of the third waveguide, from the first bend of the third waveguide to the second bend of the third waveguide, and from the second bend of the third waveguide to the output side of the third waveguide.

\* \* \* \* \*